United States Patent
Suzuki (10) Patent No.: US 10,081,151 B2
(45) Date of Patent: Sep. 25, 2018

(54) SERVO PRESS AND CONTROL METHOD

(71) Applicant: Janome Sewing Machine Co., Ltd., Tokyo (JP)

(72) Inventor: Shinji Suzuki, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 343 days.

(21) Appl. No.: 14/969,694

(22) Filed: Dec. 15, 2015

(65) Prior Publication Data

US 2016/0263854 A1 Sep. 15, 2016

(30) Foreign Application Priority Data

Mar. 13, 2015 (JP) .................................. 2015-050924

(51) Int. Cl.
| | |
|---|---|
| *B30B 15/26* | (2006.01) |
| *G05B 19/10* | (2006.01) |
| *B30B 15/14* | (2006.01) |
| *B30B 1/18* | (2006.01) |
| *G05B 19/404* | (2006.01) |

(52) U.S. Cl.
CPC .............. *B30B 15/26* (2013.01); *B30B 1/186* (2013.01); *B30B 15/148* (2013.01); *G05B 19/404* (2013.01); *G05B 2219/2622* (2013.01); *G05B 2219/45137* (2013.01); *G05B 2219/49209* (2013.01)

(58) Field of Classification Search
CPC ... B29C 66/8122; B29C 66/71; B29C 66/934; B29C 66/8246; B29C 2043/5808

USPC ....................... 100/48, 50, 214; 318/625, 687
See application file for complete search history.

(56) References Cited

U.S. PATENT DOCUMENTS

| | | | |
|---|---|---|---|
| 5,901,440 A | 5/1999 | Maeda | |
| 2008/0034985 A1* | 2/2008 | Suzuki | ...................... B30B 1/14 100/35 |
| 2009/0188966 A1* | 7/2009 | Klinstein | ................ B29C 65/08 228/102 |
| 2013/0088177 A1* | 4/2013 | Niizuma | ............... H02P 27/085 318/139 |

(Continued)

FOREIGN PATENT DOCUMENTS

| | | |
|---|---|---|
| JP | H02-224898 A | 9/1990 |
| JP | H09-314395 A | 12/1997 |

*Primary Examiner* — Jonathan Han (74) *Attorney, Agent, or Firm* — Nakanishi IP Associates, LLC (57) ABSTRACT

Highly accurate press working is performed while responding to mechanical alteration due to thermal expansion. Prior to a series of processing to a workpiece, a servomotor control unit moves a slide to a stop position, and a sensing value detecting unit detects a sensing value of a sensing element at the stop position of the slide, and stores the detected sensing value. Then, in the series of processing, the sensing value detecting unit detects a sensing value of the sensing element at the stop position of the slide, and stores the detected sensing value in the processing sensing value storing unit. A correction value calculating unit calculates a correction value based on the two store values, and a servomotor control unit controls the servomotor based on the detected slide position, the slide position that has been set, and the correction value calculated by the correction value calculating unit.

7 Claims, 9 Drawing Sheets

(56) References Cited

U.S. PATENT DOCUMENTS

2014/0367020 A1* 12/2014 Klinstein ............ B29C 66/8224
156/64

* cited by examiner

SERVO PRESS AND CONTROL METHOD

CROSS REFERENCE TO RELATED APPLICATIONS

This application is based on and claims the benefit of priority to Japanese Patent Application No. 2015-050924 filed on Mar. 13, 2015, the contents of which are hereby incorporated by reference in their entirety.

BACKGROUND OF THE INVENTION

Field of the Invention

The present invention relates to a servo press capable of performing press working with high accuracy while responding to mechanical alteration due to thermal expansion, as well as to a control method.

Description of Related Art

As can be typically seen, electronics-related products have become more and more high-tech in recent years, and highly accurate quality is demanded for components of such products. This also applies to press working, and various technological improvements have been made in order to meet such demands, for example, highly accurate processing that cannot be achieved by a conventional hydraulic press is performed by a servo press driven by a servomotor.

Figure 9:
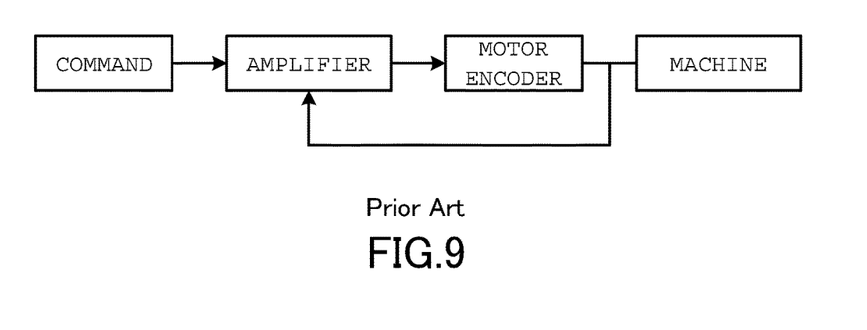
FIG. 9 is a functional block diagram according to the conventional example.

As one example, PTL 1 discloses a technique related to a press machine driven by a servomotor and stroke-controlled at a control pattern in which a slide is set. This is a control method called semi-closed loop control for controlling by monitoring an encoder of the servomotor as illustrated in FIG. 9.

CITATION LIST

Patent Literatures

PTL 1: Japanese Unexamined Patent Application Publication No. H02-224898

However, there is an issue that the semi-closed loop control is not able to respond to mechanical alteration such as thermal expansion as the control is performed by monitoring an encoder of a servomotor, and this affects accuracy in press working significantly.

SUMMARY OF INVENTION

One or more embodiments of the present invention are directed to a servo press capable of performing press working with high accuracy, while responding to mechanical alteration due to thermal expansion, as well as to a control method.

Embodiment (1)

One or more embodiments of the invention provide a servo press including: a slide configured to move up and down; a servomotor configured to drive the slide up and down; an encoder disposed at the servomotor; a slide position detecting unit configured to detect a position of the slide based on an output signal from the encoder; a setting unit configured to set a positional condition of the slide; a sensing element configured to sense a stop position of the slide; a sensing value detecting unit configured to detect a sensing value of the sensing element at the stop position of the slide; a reference sensing value storing unit configured to, prior to a series of processing to a workpiece, store the sensing value that has been detected by the sensing value detecting unit; a processing sensing value storing unit configured to, in the series of processing to the workpiece, overwrite the sensing value detected by the sensing value detecting unit; a correction value calculating unit configured to calculate a correction value based on a reference sensing value in the reference sensing value storing unit and a processing sensing value in the processing sensing value storing unit; and a servomotor control unit configured to control the servomotor based on the slide position detected by the slide position detecting unit, the slide position that has been set, and the correction value calculated by the correction value calculating unit.

According to Embodiment (1), prior to the series of processing to a workpiece, the servomotor is controlled to move the slide to the stop position based on the slide position detected by the slide position detecting unit and the slide position that has been set, and the sensing value of the sensing element at the stop position of the slide is detected, and the detected sensing value is stored in the reference sensing value storing unit. Next, in the series of processing, the sensing value of the sensing element at the stop position of the slide is detected, and the detected sensing value is stored in the processing sensing value storing unit. Further, the correction value is calculated based on the reference sensing value in the reference sensing value storing unit and the processing sensing value in the processing sensing value storing unit. Then, in the next processing, the servomotor is controlled based on the slide position detected by the slide position detecting unit, the slide position that has been set, and the correction value calculated by the correction value calculating unit. Specifically, the length of the slide (ram) thermally expanded is measured using the sensing element separate from a servo system, to correct an operational distance. The position of the sensing element is registered at an ideal workpiece reference position as reference data. Further, an amount of driving for a stroke of operation is performed by the encoder of the servomotor, the difference from the reference position registered every time for the amount of driving is calculated and reflected as the correction value in the next operation. Therefore, it is possible to perform highly accurate press working while responding to mechanical alteration due to thermal expansion that is an issue in semi-closed loop control.

Embodiment (2)

One or more embodiments of the invention provide the servo press (1) such that the sensing element is a linear encoder.

According to Embodiment (2), the sensing element is the linear encoder. Specifically, as the stop position of the slide (ram) is read by the linear encoder, a range of driving to be measured is smaller as compared to full-closed loop control. Therefore, it is possible to provide an inexpensive system by using the linear encoder with a smaller measurement range.

Embodiment (3)

One or more embodiments of the invention provide the servo press (2) such that the linear encoder is disposed at the stop position of the slide.

According to Embodiment (3), the linear encoder is disposed at the stop position of the slide. Specifically, by disposing the linear encoder at the stop position of the slide (ram), it is possible to perform positioning of a workpiece with higher accuracy.

Embodiment (4)

One or more embodiments of the invention provide the servo press (2) or (3) such that the servomotor control unit transmits an signal instructing calculation of a correction value to the correction value calculating unit, and executes control of the servomotor in a next cycle of processing based on the slide position detected by the slide position detecting unit, the slide position that has been set, and the correction value calculated by the correction value calculating unit, at timing at which the slide reaches the stop position.

According to Embodiment (4), the servomotor control unit transmits the signal instructing calculation of the correction value to the correction value calculating unit, and executes control of the servomotor in the next cycle of processing based on the slide (ram) position detected by the slide position detecting unit, the slide (ram) position that has been set, and the correction value calculated by the correction value calculating unit, at timing at which the slide (ram) reaches the stop position. Specifically, as the linear encoder is an independent encoder, it is not necessary to always read the slide (ram) position. It is sufficient to perform reading at least when the slide (ram) stops at the slide (ram) stop position. Thus, it is possible to minimize a processing load and the like that may be caused due to provision of the linear encoder.

Embodiment (5)

One or more embodiments of the invention provide the servo press (2) or (3) including: a temperature sensor configured to detect temperature around the slide, wherein when temperature data detected based on a value of the temperature sensor is greater than temperature data that has been set previously set, the servomotor control unit transmits the signal instructing calculation of a correction value to the correction value calculating unit, and executes control of the servomotor in a next cycle of processing based on the slide position detected by the slide position detecting unit, the slide position that has been set, and the correction value calculated by the correction value calculating unit.

According to Embodiment (5), the servo press includes: the temperature sensor configured to detect the temperature around the slide (ram), wherein when the temperature data detected based on the value of the temperature sensor is greater than the temperature data that has been set previously set, the servomotor control unit transmits the signal instructing calculation of the correction value to the correction value calculating unit, and executes control of the servomotor in the next cycle of processing based on the slide position detected by the slide position detecting unit, the slide position that has been set, and the correction value calculated by the correction value calculating unit, at timing at which the slide (ram) reaches the stop position. Specifically, as the linear encoder is an independent encoder, it is not necessary to always read the slide (ram) position. It is sufficient to perform reading at least when the slide (ram) stops at the slide (ram) stop position, at timing at which the slide (ram) reaches the stop position, when the temperature data detected based on the value of the temperature sensor is greater than the temperature data that has been previously set. Thus, it is possible to minimize the processing load and the like that may be caused due to provision of the linear encoder.

Embodiment (6)

One or more embodiments of the invention provide the servo press (2) or (3) including: a threshold value storing unit configured to store a threshold value for a magnitude of the correction value, wherein when the correction value calculated by the correction value calculating unit is greater than the threshold value stored in the threshold value storing unit, the servomotor control unit executes control of the servomotor in a next cycle of processing based on the slide position detected by the slide position detecting unit, the slide position that has been set, and the correction value calculated by the correction value calculating unit, at timing at which the slide reaches the stop position.

According to Embodiment (6), the servo press includes: the threshold value storing unit configured to store the threshold value for a magnitude of the correction value, wherein when the correction value calculated by the correction value calculating unit is greater than the threshold value stored in the threshold value storing unit, the servomotor control unit executes control of the servomotor in the next cycle of processing based on the slide position detected by the slide position detecting unit, the slide position that has been set, and the correction value calculated by the correction value calculating unit, at timing at which the slide reaches the stop position.

Specifically, as the linear encoder is an independent encoder, it is not necessary to always read the slide (ram) position. It is sufficient to perform reading at least when the slide (ram) stops at the slide (ram) stop position, at timing at which the slide (ram) reaches the stop position. Further, when the position of the slide (ram) is read to calculate the correction value, this correction value is reflected in the next cycle of processing only when the calculated correction value is greater than the previously set threshold value. Thus, it is possible to minimize the processing load and the like that may be caused due to provision of the linear encoder.

Embodiment (7)

One or more embodiments of the invention provide a control method for a servo press including: a slide configured to move up and down; a servomotor configured to drive the slide up and down; an encoder disposed at the servomotor; a slide position detecting unit; a setting unit configured to set a positional condition of the slide; a sensing element configured to sense a stop position of the slide; a sensing value detecting unit configured to detect a sensing value of the sensing element at the stop position of the slide; a reference sensing value storing unit; a processing sensing value storing unit; a correction value calculating unit; and a servomotor control unit, the method including: a first step in which prior to a series of processing to a workpiece, the servomotor control unit moves the slide to the stop position by controlling the servomotor based on the slide position detected by the slide position detecting unit, and the slide position that has been set; a second step in which the sensing value detecting unit detects the sensing value of the sensing element at the stop position of the slide, and stores the detected sensing value in the reference sensing value storing unit; a third step in which in the series of processing, the sensing value detecting unit detects the sensing value of the sensing element at the stop position of the slide, and stores the detected sensing value in the processing sensing value storing unit; a fourth step in which the correction value calculating unit calculates a correction value based on a reference sensing value in the reference sensing value storing unit and a processing sensing value in the processing sensing value storing unit; and a fifth step in which in a next processing, the servomotor control unit controls the servomotor based on the slide position detected by the slide position detecting unit, the slide position that has been set, and the correction value calculated by the correction value calculating unit.

According to Embodiment (7), prior to the series of processing to a workpiece, the servomotor is controlled to move the slide to the stop position based on the slide position detected by the slide position detecting unit and the slide position that has been set, and the sensing value of the sensing element at the stop position of the slide is detected, and the detected sensing value is stored in the reference sensing value storing unit. Next, in the series of processing, the sensing value of the sensing element at the stop position of the slide is detected, and the detected sensing value is stored in the processing sensing value storing unit. Further, the correction value is calculated based on the reference sensing value in the reference sensing value storing unit and the processing sensing value in the processing sensing value storing unit. Then, in the next processing, the servomotor is controlled based on the slide position detected by the slide position detecting unit, the slide position that has been set, and the correction value calculated by the correction value calculating unit. Specifically, the length of the slide (ram) thermally expanded is measured using the sensing element separate from a servo system, to correct an operational distance. The position of the sensing element is registered at an ideal workpiece reference position as reference data. Further, an amount of driving for a stroke of operation is performed by the encoder of the servomotor, the difference from the reference position registered every time for the amount of driving is calculated and reflected as the correction value in the next operation. Therefore, it is possible to perform highly accurate press working while responding to mechanical alteration due to thermal expansion that is an issue in semi-closed loop control.

Embodiment (8)

One or more embodiments of the invention provide a recording medium recording a program for causing a computer to execute a control method for a servo press including: a slide configured to move up and down; a servomotor configured to drive the slide up and down; an encoder disposed at the servomotor; a slide position detecting unit; a setting unit configured to set a positional condition of the slide; a sensing element configured to sense a stop position of the slide; a sensing value detecting unit configured to detect a sensing value of the sensing element at the stop position of the slide; a reference sensing value storing unit; a processing sensing value storing unit; a correction value calculating unit; and a servomotor control unit, the program causing the computer to execute the method including: a first step in which prior to a series of processing to a workpiece, the servomotor control unit moves the slide to the stop position by controlling the servomotor based on the slide position detected by the slide position detecting unit, and the slide position that has been set; a second step in which the sensing value detecting unit detects the sensing value of the sensing element at the stop position of the slide, and stores the detected sensing value in the reference sensing value storing unit; a third step in which in the series of processing, the sensing value detecting unit detects the sensing value of the sensing element at the stop position of the slide, and stores the detected sensing value in the processing sensing value storing unit; a fourth step in which the correction value calculating unit calculates a correction value based on a reference sensing value in the reference sensing value storing unit and a processing sensing value in the processing sensing value storing unit; and a fifth step in which in a next processing, the servomotor control unit controls the servomotor based on the slide position detected by the slide position detecting unit, the slide position that has been set, and the correction value calculated by the correction value calculating unit.

According to Embodiment (8), prior to the series of processing to a workpiece, the servomotor is controlled to move the slide to the stop position based on the slide position detected by the slide position detecting unit and the slide position that has been set, and the sensing value of the sensing element at the stop position of the slide is detected, and the detected sensing value is stored in the reference sensing value storing unit. Next, in the series of processing, the sensing value of the sensing element at the stop position of the slide is detected, and the detected sensing value is stored in the processing sensing value storing unit. Further, the correction value is calculated based on the reference sensing value in the reference sensing value storing unit and the processing sensing value in the processing sensing value storing unit. Then, in the next processing, the servomotor is controlled based on the slide position detected by the slide position detecting unit, the slide position that has been set, and the correction value calculated by the correction value calculating unit. Specifically, the length of the slide (ram) thermally expanded is measured using the sensing element separate from a servo system, to correct an operational distance. The position of the sensing element is registered at an ideal workpiece reference position as reference data. Further, an amount of driving for a stroke of operation is performed by the encoder of the servomotor, the difference from the reference position registered every time for the amount of driving is calculated and reflected as the correction value in the next operation. Therefore, it is possible to perform highly accurate press working while responding to mechanical alteration due to thermal expansion that is an issue in semi-closed loop control.

According to one or more embodiments of the present invention, it is possible to provide an effect of allowing highly accurate press working while responding to mechanical alteration due to thermal expansion that is an issue in semi-closed loop control.

According to one or more embodiments of the present invention, it is possible to provide an effect of allowing highly accurate press working at low cost by providing the linear encoder separately from a servo system.

According to one or more embodiments of the present invention, it is possible to provide an effect of allowing positioning of a workpiece with higher accuracy by disposing the linear encoder at the stop position of the slide (ram).

According to one or more embodiments of the present invention, as the linear encoder is an independent encoder, it is not necessary to always read the slide (ram) position. It is sufficient to perform reading at least when the slide (ram) stops at the slide (ram) stop position. Thus, it is possible to provide an effect of minimizing a processing load and the like that may be caused due to provision of the linear encoder.

According to one or more embodiments of the present invention, as the linear encoder is an independent encoder, it is not necessary to always read the slide (ram) position. It is sufficient to perform reading at least when the slide (ram) stops at the slide (ram) stop position, at timing at which the slide (ram) reaches the stop position, when the temperature data detected based on the value of the temperature sensor is greater than the temperature data that has been previously set. Thus, it is possible to provide an effect of minimizing a processing load and the like that may be caused due to provision of the linear encoder.

According to one or more embodiments of the present invention, as the linear encoder is an independent encoder, it is not necessary to always read the slide (ram) position. It is sufficient to perform reading at least when the slide (ram) stops at the slide (ram) stop position, at timing at which the slide (ram) reaches the stop position. Further, when the position of the slide (ram) is read to calculate the correction value, this correction value is reflected in the next cycle of processing only when the calculated correction value is greater than the previously set threshold value. Thus, it is possible to provide an effect of minimizing a processing load and the like that may be caused due to provision of the linear encoder.

DETAILED DESCRIPTION

Hereinafter, an embodiment of the present invention will be described in detail with reference to the drawings.

It should be noted that components in this embodiment may be replaced by existing components as appropriate, and variations including combinations with other existing components may also be possible. Therefore, the description of this embodiment may not limit the scope of the invention defined by the claims.

First Embodiment

Hereinafter, the first embodiment of the present invention will be described with reference to FIG. 1 through FIG. 4.

Figure 1:
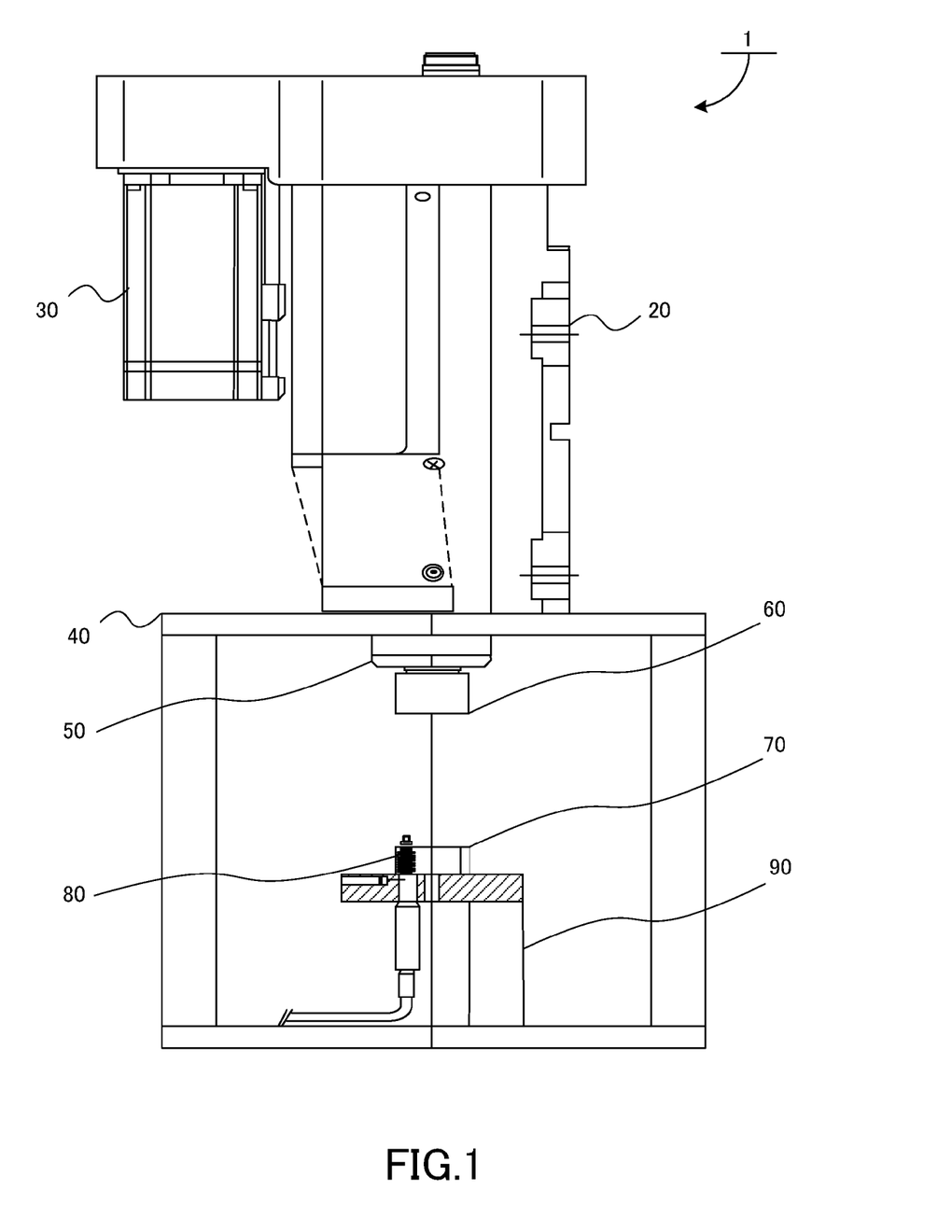
FIG. 1 is a side view of a servo press according to one or more embodiments of the present invention.

As illustrated in FIG. 1, a servo press 1 according to this embodiment is configured by a press main body 20, a servomotor 30, a table 40 on which the press main body 20 is placed, a ram 50 moving up and down with respect to the press main body 20, a shank 60, a workpiece 70, a linear encoder 80, and a workpiece attachment base 90 for attaching a workpiece.

The servo press 1 is disposed at a frame that is not shown, and the table 40 is disposed under the frame. The workpiece attachment base 90 is disposed horizontally within the table 40, and the workpiece 70 is attached to an upper surface of the workpiece attachment base 90. Further, the ram 50 and the shank 60 disposed at a tip portion of the ram 50 are inserted through the press main body 20 into the table 40, and move up and down.

The ram 50 is connected with the servomotor 30 via a power conversion member and a rotation transmission member that are not shown, and driven by the servomotor 30. Further, the servomotor 30 is connected to a control device that will be later described. The ram 50 driven by the servomotor 30 is controlled based on a control pattern that has been input to the control device or a control pattern automatically set based on a processing condition that has been input. In this control, the ram 50 may be driven from a rising point (start position) to a lowering point (stop position) to perform press working, and an intermediate point is defined between the rising point (start position) and the lowering point (stop position). Processing may be performed more accurately by setting a different speed from the intermediate point to the lowering point (stop position).

<Overall Configuration and Control>

An overall configuration and control of the servo press according to this embodiment will be described with reference to FIG. 2 and FIG. 3.

Figure 2:
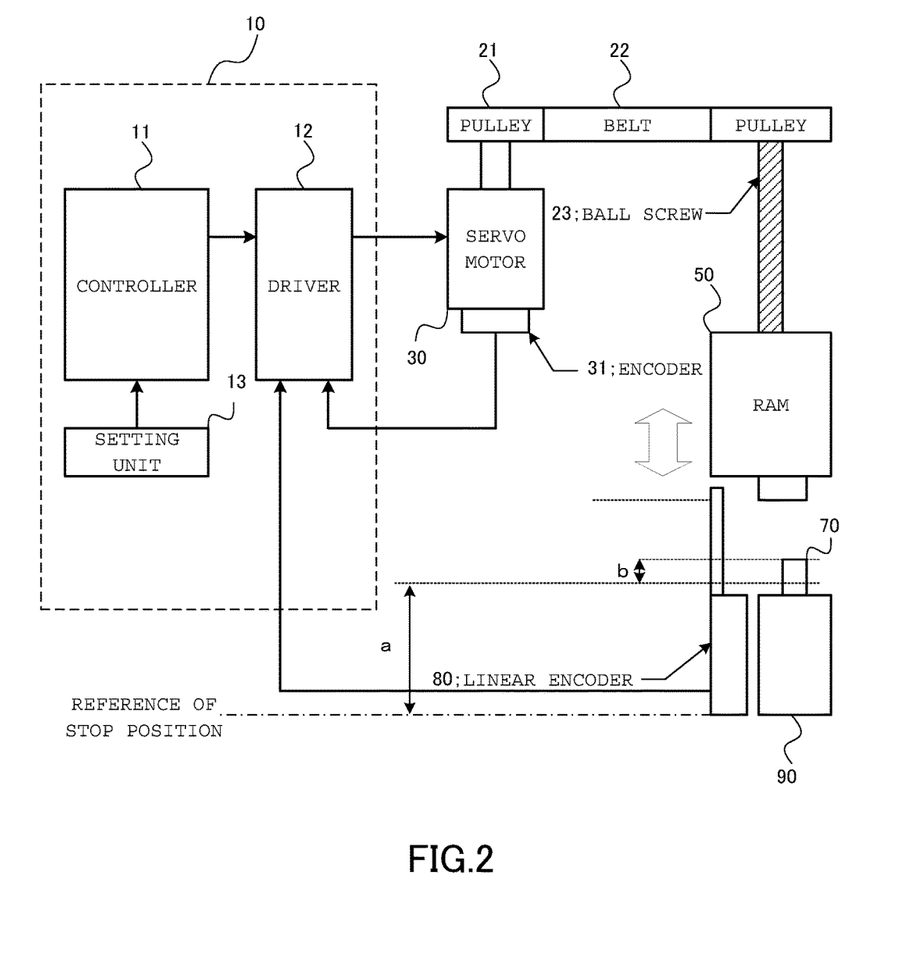
FIG. 2 is overall illustration of a structure and control of the servo press according to one or more embodiments of the present invention.

As illustrated in FIG. 2, the servo press 1 according to this embodiment is configured by a control device 10, a controller 11 that constitutes a control device 10, a driver 12, a setting unit 13, a pulley 21, a belt 22, a ball screw 23, the servomotor 30, an encoder 31, the ram 50, the workpiece 70, the linear encoder 80, and the workpiece attachment base 90.

Above the frame, the servomotor 30 as a power source of the servo press 1 and the pulley 21 as the rotation transmission member for converting a rotative force of the servomotor 30 into reciprocating motion are attached. The servomotor 30 is disposed at the encoder 31 for detecting rotating speed, and the rotating speed of the servomotor 30 is controlled by the control device 10 controlling current supplied to the servomotor 30. The rotative force of the servomotor 30 is transmitted to the ball screw 23 by the belt 22 as the rotation transmission member. The servomotor 30 may be either of an alternating-current motor and a direct-current motor.

Further, the rotation transmission member is exemplified by, but not limited to, the pulley 21, and may be a chain or a gear. Moreover, the rotation transmission member may be directly coupled to an output axis of the servomotor 30. Furthermore, the power conversion device is exemplified by, but not limited to, the ball screw 23, and may be a screw mechanism, a combination of a worm gear and a worm wheel, or a combination of a pinion gear and a rack. To a lower end of the ball screw 23, the ram 50 that moves up and down at a position facing against the workpiece attachment base 90 is attached, and press working is performed to a workpiece (object to be processed) 70 by the ram 50 moving down from an uppermost position (start position) to a lowermost position (stop position). Then, the ram 50 moves up to the uppermost position (start position), after reaching the lowermost position (stop position) and processing to the workpiece (object to be processed) 70 ends.

The encoder 31 is attached to a predetermined position of the servomotor 30. The linear encoder 80 is preferably disposed at a stop position of the ram 50. Specifically, the attachment position of the linear encoder 80 is determined based on an ideal processing position of the workpiece 70 (a in FIG. 2), and data of the linear encoder 80 at this position is taken as reference data. It should be noted that b in FIG. 2 indicates a push-in amount of the ram 50 to the workpiece 70.

Here, the linear encoder 80 is an element for detecting and outputting a position along a linear axis as position information, and also referred to as a positioning encoder, or a linear scale. The linear encoder is configured by a scale (scale marks) as a ruler, and a head (detector) for detecting the position information, and an optical type using light reflection for detection uses a detection head fixed to the ram 50 that is disposed at a position facing against the linear encoder 80 and that is not shown. In other words, by the detection head moving up and down with respect to the linear encoder 80 that is fixed along with the up and down movement of the ram 50, a sensor built within the detection head detects the position of the ram 50 as a height based on the reference stop position of the ram 50. Other than the types listed above, there is a magnetic type using magnetism, which further includes an absolute type performing absolute position measurement and an increment type performing relative position measurement.

In press working, data such as operating speed of the ram 50, a switching position of the speed, lowermost position (stop position), and time for pressurization as control conditions, is set via the setting unit 13. The set data is displayed in a display unit that is not shown. The display unit is configured by a setting switch and unit such as a liquid crystal display screen or a CRT. Further, the display unit is disposed at switches for selecting an operational mode such as operation and condition setting, and for instructing operation such as automatic operation or manual operation, for example.

Then, the control data input through the display unit is taken and recorded in a memory unit that is later described, and the ram 50 is controlled according to a previously installed procedures. The control device 10 is configured as a commonly-used computer or the like having functions such as data recording, computation, data display, and input and output of data.

<Functional Blocks of Servo Press>

Figure 3:
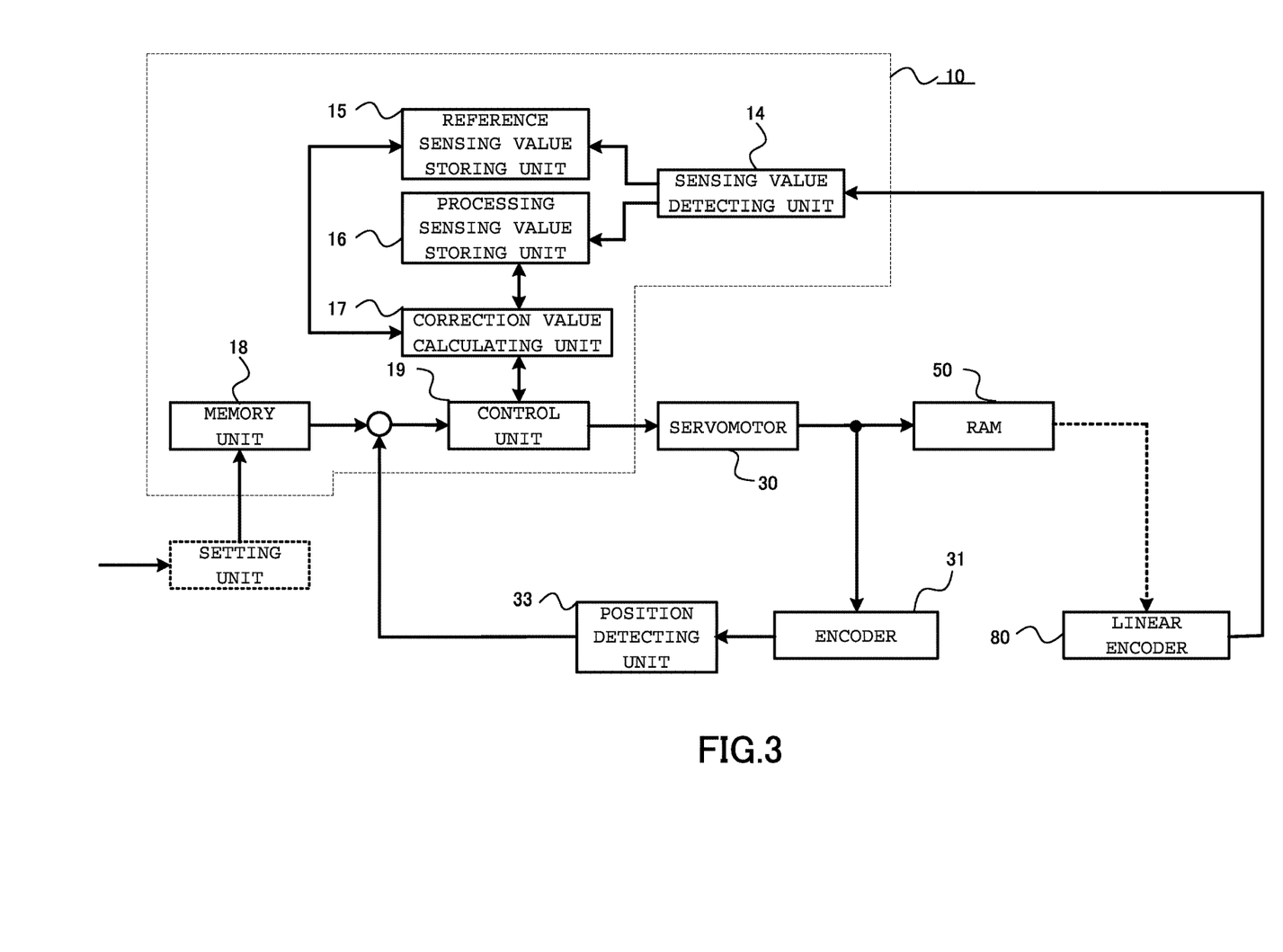
FIG. 3 is a functional block diagram of the servo press according to one or more embodiments of the present invention.

As illustrated in FIG. 3, the servo press 1 according to this embodiment is configured by the control device 10, a sensing value detecting unit 14 that constitutes the control device 10, a reference sensing value storing unit 15, a processing sensing value storing unit 16, a correction value calculating unit 17, a memory unit 18, a control unit 19, the servomotor 30, the encoder 31, a position detecting unit 33, the ram 50, and the linear encoder 80.

The sensing value detecting unit 14 detects a sensing value of the linear encoder 80 at the stop position of the ram 50 taking a signal output from the control unit 19 as a trigger, prior to a series of processing to the workpiece 70 and at timing at which the ram 50 reaches the stop position. The sensing value detecting unit 14 also detects the sensing value of the linear encoder 80 at the stop position of the ram 50 taking a signal output from the control unit 19 as a trigger, in the series of processing to the workpiece 70 and at timing at which the ram 50 reaches the stop position.

The reference sensing value storing unit 15 stores the sensing value of the linear encoder 80 detected by the sensing value detecting unit 14 at the stop position of the ram 50 prior to the series of processing to the workpiece 70. The processing sensing value storing unit 16 stores the sensing value of the linear encoder 80 detected by the sensing value detecting unit 14 at the stop position of the ram 50 in the series of processing to the workpiece 70. The stored sensing value is over written by a new sensing value and stored.

The correction value calculating unit 17 calculates a correction value based on a reference sensing value in the reference sensing value storing unit 15 and a processing sensing value in the processing sensing value storing unit 16. The control unit 19 outputs a signal for instructing calculation of a correction value to the correction value calculating unit 17, in the series of processing to the workpiece 70 and at timing at which the ram 50 reaches the stop position, and executes control of the servomotor based on the slide position detected by the position detecting unit 33, the slide position that has been set, and the correction value calculated by the correction value calculating unit 17. The memory unit 18 stores a predetermined operating condition.

Here, it is preferable that the downward movement of the ram 50 be subjected to motion control. In other words, a high-speed approach control is performed down to a previously set lowering position, and low-speed prove control is performed from the previously set lowering position. Specifically, output torque is detected from current of the servomotor command controlling the servomotor 30, and motion change of the ram 50 is detected as a change in the torque of the servomotor 30. Then, the previously set lowering position is again specified based on the detected signal of the change in the torque.

<Control Processing of Servo Press>

Figure 4:
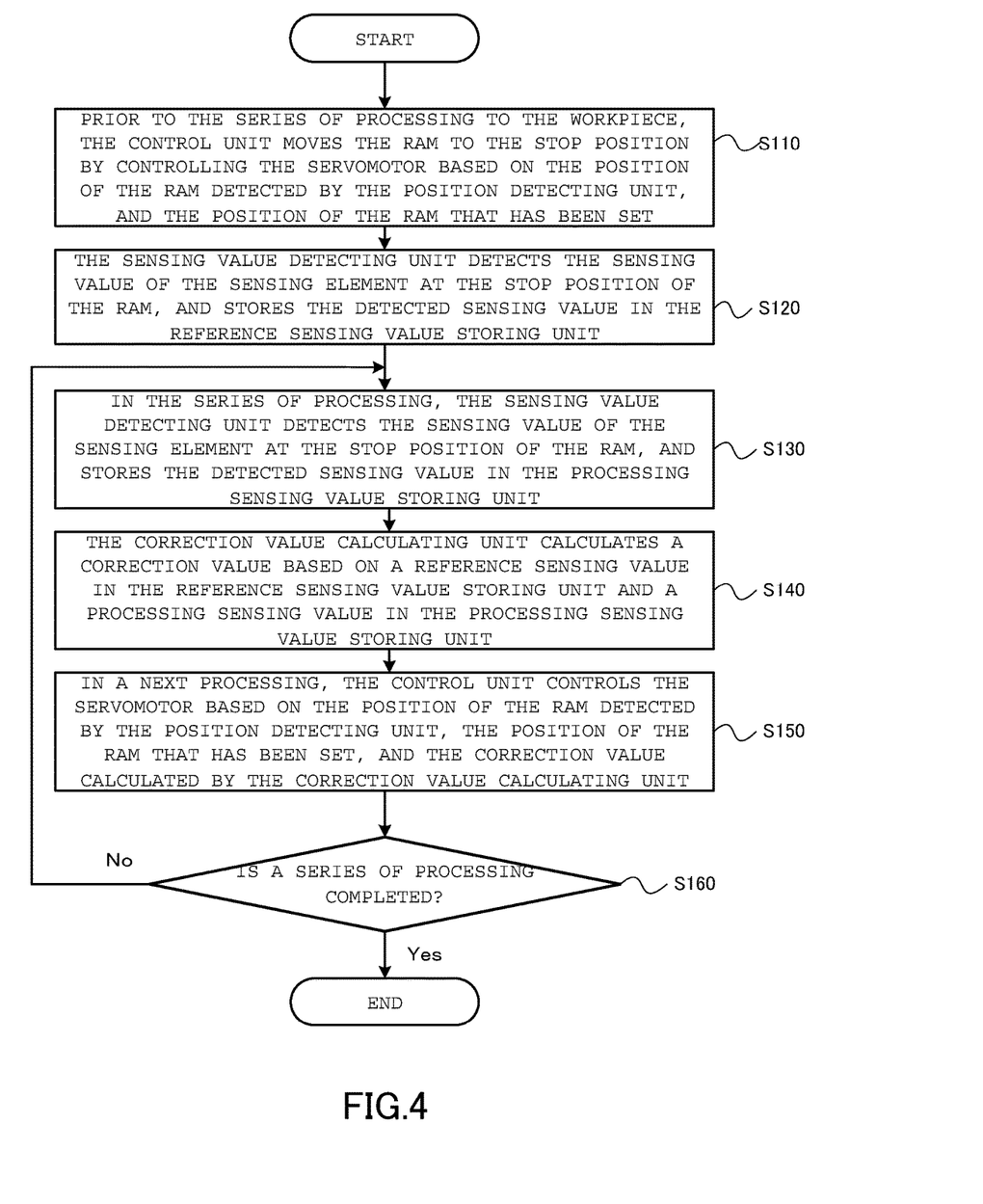
FIG. 4 is a flowchart of control of the servo press according to one or more embodiments of the present invention.

Control processing of the servo press according to this embodiment will be described with reference to FIG. 4.

Prior to the series of processing to the workpiece 70, the control unit 19 moves the slide (ram) 50 to the stop position by controlling the servomotor 30 based on the position of the slide (ram) 50 detected by the position detecting unit 33, and the position of the slide (ram) 50 that has been set (Step S110).

The sensing value detecting unit 14 detects the sensing value of the sensing element (linear encoder) 80 at the stop position of the slide (ram) 50, and stores the detected sensing value in the reference sensing value storing unit 15 (Step S120).

In the series of processing, the sensing value detecting unit 14 detects the sensing value of the sensing element (linear encoder) 80 at the stop position of the slide (ram) 50, and stores the detected sensing value in the processing sensing value storing unit 16 (Step S130).

The correction value calculating unit 17 calculates a correction value based on a reference sensing value in the reference sensing value storing unit 15 and a processing sensing value in the processing sensing value storing unit 16 (Step S140).

In a next processing, the control unit 19 controls the servomotor based on the position of the slide (ram) 50 detected by the position detecting unit 33, the position of the slide (ram) 50 that has been set, and the correction value calculated by the correction value calculating unit 17 (Step S150). Then, the processing from Step S130 to Step S150 are continued ("No" in Step S160) until the series of processing is completed, and when the series of processing is completed, all the processing is terminated ("Yes" in Step S160).

As described above, according to this embodiment, it is possible to perform highly accurate press working while responding to mechanical alteration due to thermal expansion that is an issue in semi-closed loop control. Further, by disposing the linear encoder separately from a servo system, it is possible to perform highly accurate press working at low cost. Moreover, by disposing the linear encoder at the stop position of the slide (ram), it is possible to perform positioning of a workpiece with higher accuracy. Furthermore, as the linear encoder is an independent encoder, it is not necessary to always read the slide (ram) position. It is sufficient to perform reading at least when the slide (ram) stops at the slide (ram) stop position. Thus, it is possible to minimize a processing load and the like that may be caused due to provision of the linear encoder.

Second Embodiment

Figure 5:
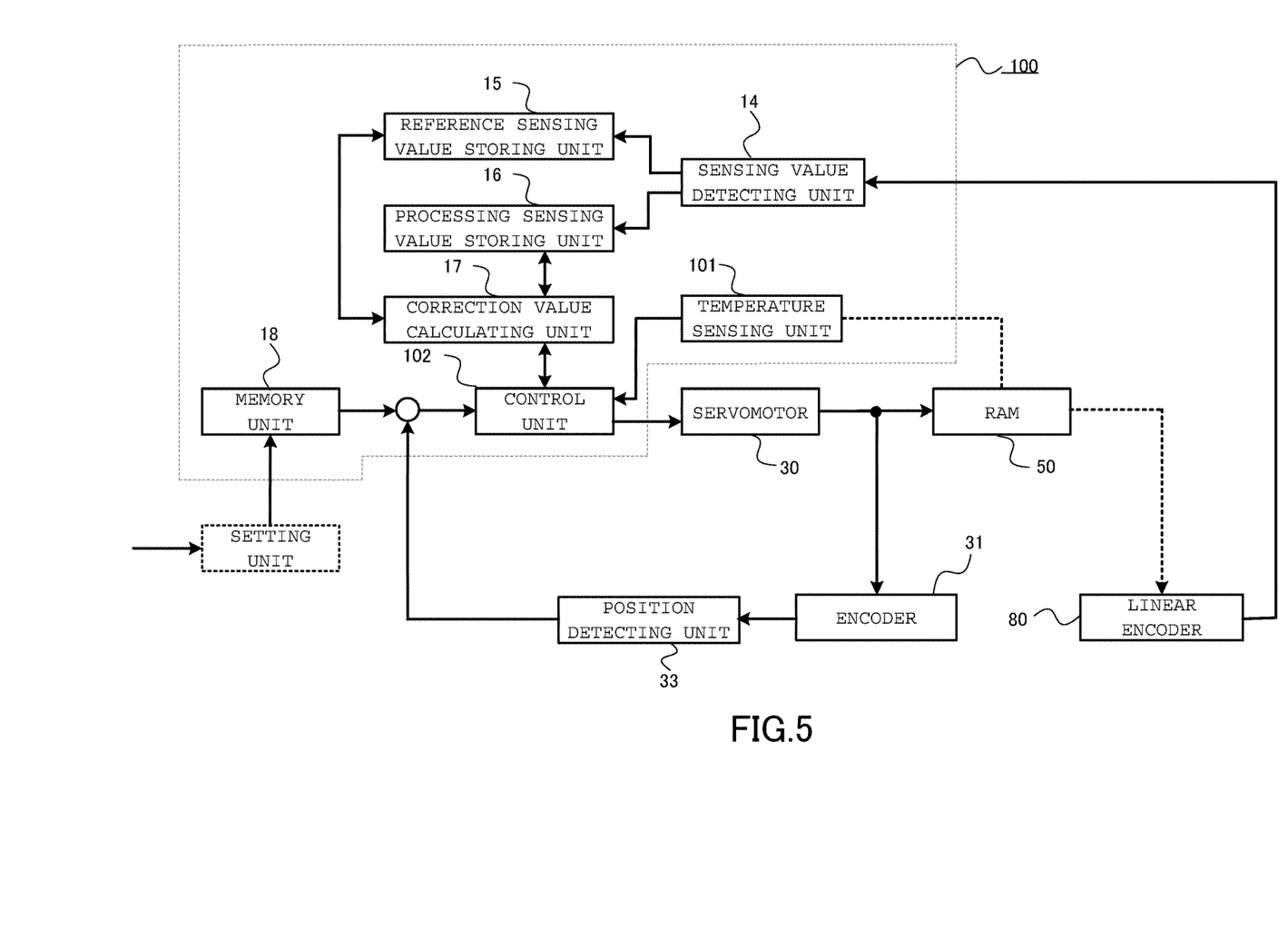
FIG. 5 is a functional block diagram of the servo press according to one or more embodiments of the present invention.
Figure 6:
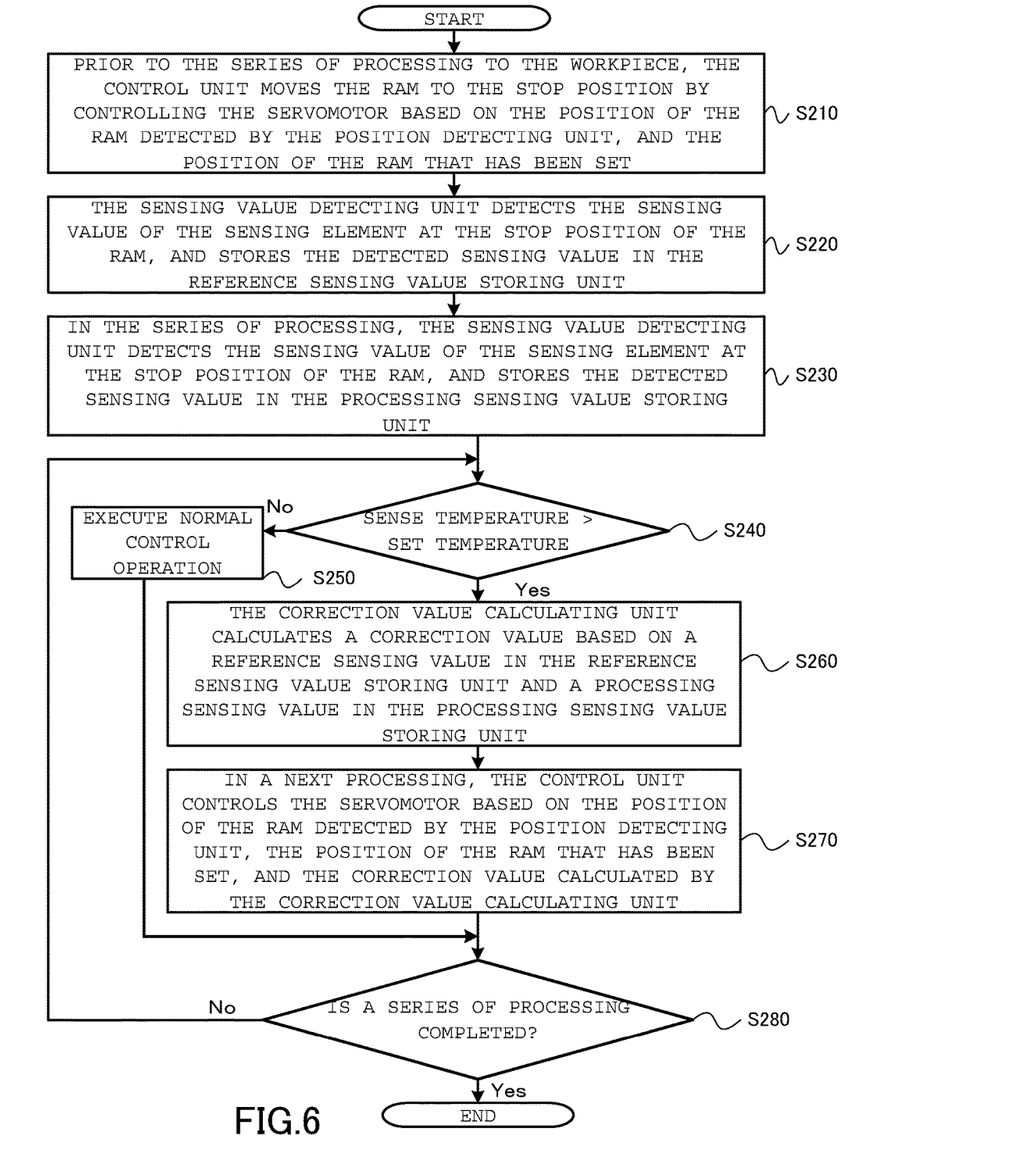
FIG. 6 is a flowchart of control of the servo press according to one or more embodiments of the present invention.

Hereinafter, the second embodiment of the present invention will be described with reference to FIG. 5 through FIG. 6.
<Functional Blocks of Servo Press>
As illustrated in FIG. 5, the servo press 1 according to this embodiment is configured by a control device 100, a sensing value detecting unit 14 that constitutes the control device 100, a reference sensing value storing unit 15, a processing sensing value storing unit 16, a correction value calculating unit 17, a memory unit 18, a control unit 102, a temperature sensing unit 101, a servomotor 30, an encoder 31, a position detecting unit 33, a ram 50, and a linear encoder 80. Components with like reference numerals as those in the first embodiment have the same functions, and detailed descriptions for such components shall be omitted.

The temperature sensing unit 101 detects temperature around the ram 50. When temperature data detected based on a value of the temperature sensor is greater than temperature data that has been set previously set, the control unit 102 transmits an signal instructing calculation of a correction value to the correction value calculating unit 17, and executes control of the servomotor in a next cycle of processing based on the position of the slide (ram) detected by the position detecting unit 33, the position of the slide (ram) that has been set, and the correction value calculated by the correction value calculating unit 17, at timing at which the slide 50 reaches the stop position.
<Control Processing of Servo Press>
Control processing of the servo press according to this embodiment will be described with reference to FIG. 6.

Prior to the series of processing to the workpiece 70, the control unit 102 moves the slide (ram) 50 to the stop position by controlling the servomotor 30 based on the position of the slide (ram) 50 detected by the position detecting unit 33, and the position of the slide (ram) 50 that has been set (Step S210).

The sensing value detecting unit 14 detects the sensing value of the sensing element (linear encoder) 80 at the stop position of the slide (ram) 50, and stores the detected sensing value in the reference sensing value storing unit 15 (Step S220).

In the series of processing, the sensing value detecting unit 14 detects the sensing value of the sensing element (linear encoder) 80 at the stop position of the slide (ram) 50, and stores the detected sensing value in the processing sensing value storing unit 16 (Step S230).

The control unit 102 determines whether or not the temperature around the ram 50 detected by the temperature sensing unit 101 is higher than temperature that has been previously set (Step S240). At this time, if the control unit 102 determines that the temperature around the ram 50 detected by the temperature sensing unit 101 is lower than the temperature that has been previously set ("No" in Step S240), the control unit 102 executes normal control operation (Step S250), and the processing moves to Step 280.

On the other hand, if the control unit 102 determines that the temperature around the ram 50 detected by the temperature sensing unit 101 is higher than the temperature that has been previously set ("Yes" in Step S240), the correction value calculating unit 17 calculates a correction value based on a reference sensing value in the reference sensing value storing unit 15 and a processing sensing value in the processing sensing value storing unit 16 (Step S260).

In a next processing, the control unit 102 controls the servomotor based on the position of the slide (ram) 50 detected by the position detecting unit 33, the position of the slide (ram) 50 that has been set, and the correction value calculated by the correction value calculating unit 17 (Step S270). Then, the processing from Step S240 to Step S270 are continued ("No" in Step S280), until the series of processing is completed, and when the series of processing is completed, all the processing is terminated ("Yes" in Step S280).

As described above, according to this embodiment, it is possible to perform highly accurate press working while responding to mechanical alteration due to thermal expansion that is an issue in semi-closed loop control. Further, as the linear encoder is an independent encoder, it is not necessary to always read the slide (ram) position. It is sufficient to perform reading at least when the slide (ram) stops at the slide (ram) stop position, at timing at which the slide (ram) reaches the stop position, when the temperature data detected based on the value of the temperature sensor is greater than the temperature data that has been previously set. Thus, it is possible to minimize a processing load and the like that may be caused due to provision of the linear encoder.

Third Embodiment

Figure 7:
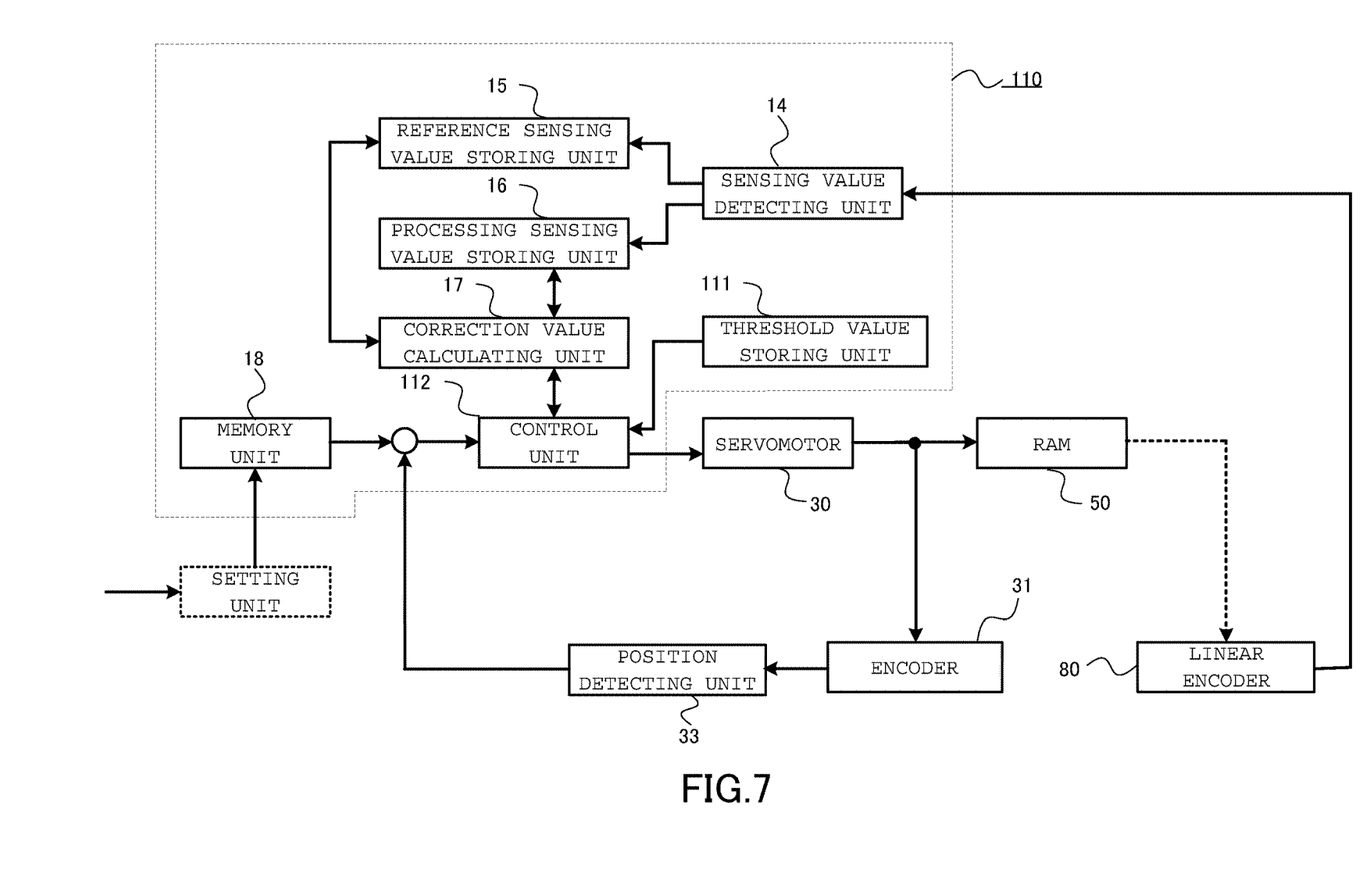
FIG. 7 is a functional block diagram of the servo press according to one or more embodiments of the present invention.
Figure 8:
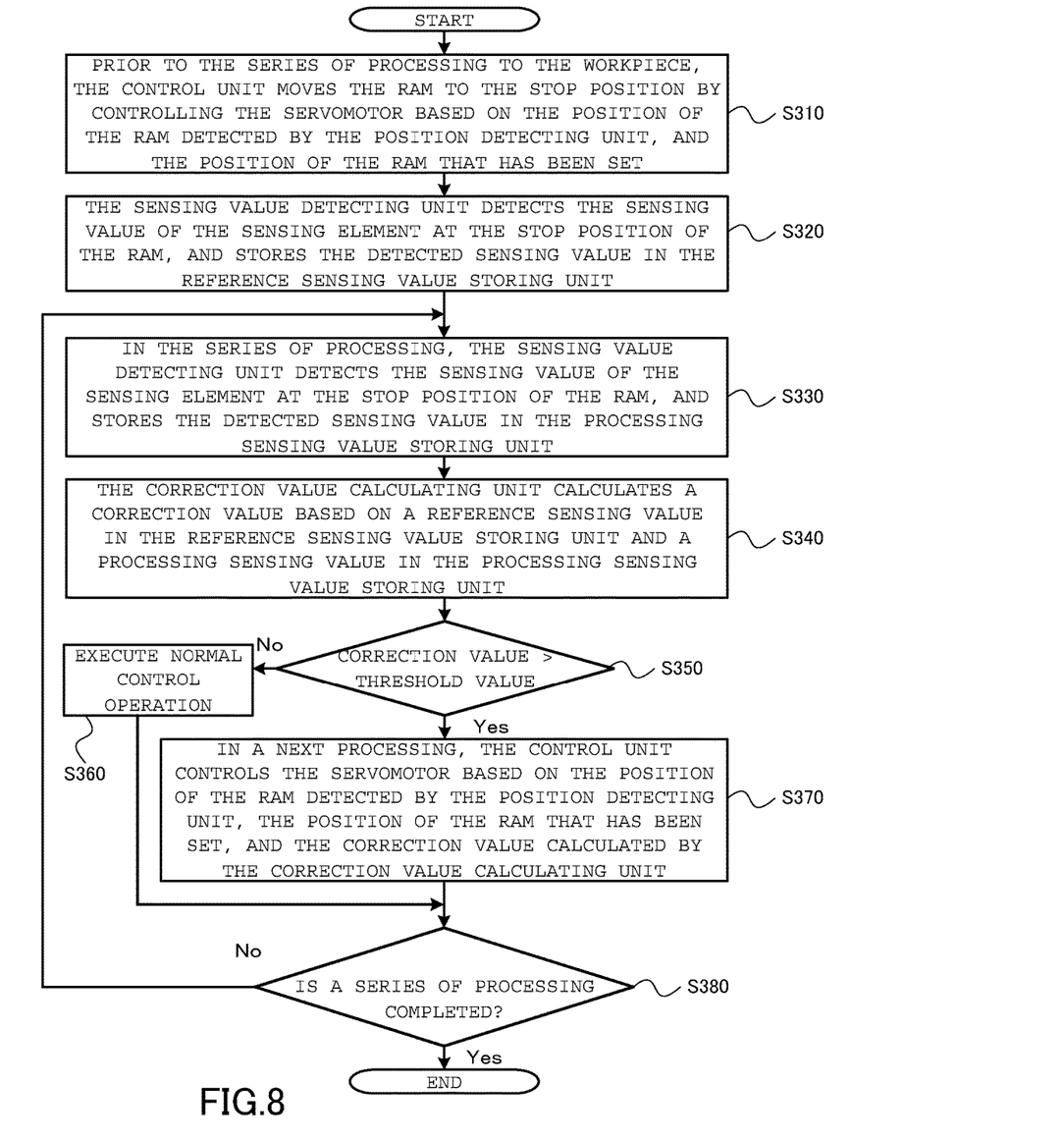
FIG. 8 is a flowchart of control of the servo press according to one or more embodiments of the present invention.

Hereinafter, the third embodiment of the present invention will be described with reference to FIG. 7 through FIG. 8.
<Functional Blocks of Servo Press>
As illustrated in FIG. 7, the servo press 1 according to this embodiment is configured by a control device 110, a sensing value detecting unit 14 that constitutes the control device 110, a reference sensing value storing unit 15, a processing sensing value storing unit 16, a correction value calculating unit 17, a memory unit 18, a control unit 112, a threshold value storing unit 111, a servomotor 30, an encoder 31, a position detecting unit 33, a ram 50, and a linear encoder 80. Components with like reference numerals as those in the first embodiment and the second embodiment have the same functions, and detailed descriptions for such components shall be omitted.

The threshold value storing unit 111 stores a threshold value previously determined for a magnitude of a correction value. When a correction value calculated by the correction value calculating unit 17 is greater than the threshold value stored in the threshold value storing unit 111, the control unit 112 executes control of the servomotor in a next cycle of processing based on the position of the slide (ram) detected by the position detecting unit 33, the position of the slide (ram) that has been set, and the correction value calculated by the correction value calculating unit 17, at timing at which the slide (ram) 50 reaches the stop position.
<Control Processing of Servo Press>
Control processing of the servo press according to this embodiment will be described with reference to FIG. 8.

Prior to the series of processing to the workpiece 70, the control unit 112 moves the slide (ram) 50 to the stop position by controlling the servomotor 30 based on the position of the slide (ram) 50 detected by the position detecting unit 33, and the position of the slide (ram) 50 that has been set (Step S310).

The sensing value detecting unit 14 detects the sensing value of the sensing element (linear encoder) 80 at the stop position of the slide (ram) 50, and stores the detected sensing value in the reference sensing value storing unit 15 (Step S320).

In the series of processing, the sensing value detecting unit 14 detects the sensing value of the sensing element (linear encoder) 80 at the stop position of the slide (ram) 50, and stores the detected sensing value in the processing sensing value storing unit 16 (Step S330). The correction value calculating unit 17 calculates a correction value based on a reference sensing value in the reference sensing value storing unit 15 and a processing sensing value in the processing sensing value storing unit 16 (Step S340).

The control unit 112 determines whether or not the correction value calculated by the correction value calculating unit 17 is greater than the threshold value previously stored in the threshold value storing unit 111 (Step S350). At this time, if the control unit 112 determines that the correction value calculated by the correction value calculating unit 17 is smaller than the threshold value previously stored in the threshold value storing unit 111 ("No" in Step S350), the control unit 112 executes normal control operation (Step S360), and the processing moves to Step S380.

On the other hand, if the control unit 112 determines that the correction value calculated by the correction value calculating unit 17 is greater than the threshold value previously stored in the threshold value storing unit 111 ("Yes" in Step S350), the control unit 112 controls, in a next processing, the servomotor based on the position of the slide (ram) 50 detected by the position detecting unit 33, the position of the slide (ram) 50 that has been set, and the correction value calculated by the correction value calculating unit 17 (Step S370). Then, the processing from Step S330 to Step S370 are continued ("No" in Step S380), until the series of processing is completed, and when the series of processing is completed, all the processing is terminated ("Yes" in Step S380).

As described above, according to this embodiment, it is possible to perform highly accurate press working while responding to mechanical alteration due to thermal expansion that is an issue in semi-closed loop control. Further, as the linear encoder is an independent encoder, it is not necessary to always read the slide (ram) position. It is sufficient to perform reading at least when the slide (ram) stops at the slide (ram) stop position, at timing at which the slide (ram) reaches the stop position. Moreover, when the position of the slide (ram) is read to calculate the correction value, this correction value is reflected in the next cycle of processing only when the calculated correction value is greater than the previously set threshold value. Thus, it is possible to minimize a processing load and the like that may be caused due to provision of the linear encoder.

It should be noted that it is possible to realize the servo press according to the present invention by recording the processing of the servo press described above in a medium that is readable by a computer system, and having the servo press read and execute the recorded in the medium. As used herein, examples of the computer system include an OS and hardware such as peripheral devices.

In a case in which WWW (World Wide Web) system is utilized, the examples of the "computer system" further include a web page disposing environment (or display environment). Further, the program may be transmitted to other computer systems from the computer system having the program recorded in its recording device or the like, via a transmission medium, or a transmitted wave in the transmission medium. As used herein, the "transmission medium" that transmits the program refers to a medium having a function of transmitting information, examples of which including a network (communication network) such as the Internet and a communication line (communication wire) such as a telephone line.

Moreover, the program may realize a part of the functions described above. Furthermore, the program may be a so-called difference file (difference program) that may realize the functions described above in combination with a program that is already recorded in the computer system.

Thus, the embodiment of this invention has been described with the drawings, but specific configurations are not limited to the embodiment described above, and include various designs not departing from the scope of the invention.

REFERENCE SIGNS LIST

1: servo press
10: control device
100: control device
110: control device
11: controller
12: driver
13: setting unit
14: sensing value detecting unit
15: reference sensing value storing unit
16: processing sensing value storing unit
17: correction value calculating unit
18: memory unit
19: control unit
102: control unit
112: control unit
20: press main body
21: pulley
22: belt
23: ball screw
30: servomotor
31: encoder
33: position detecting unit
40: table
50: ram
60: shank
70: workpiece
80: linear encoder
101: temperature sensing unit
111: threshold value storing unit

What is claimed is:

1. A servo press comprising:
    a slide configured to move up and down;
    a servomotor configured to drive the slide up and down;
    an encoder disposed at the servomotor;
    a slide position detecting unit configured to detect a position of the slide based on an output signal from the encoder;
    a setting unit configured to set a positional condition of the slide;
    a linear encoder configured to sense a stop position of the slide;
    a sensing value detecting unit configured to detect a sensing value of the linear encoder at the stop position of the slide;

a reference sensing value storing unit configured to, prior to a series of processing to a workpiece, store the sensing value that has been detected by the sensing value detecting unit;

a processing sensing value storing unit configured to, in the series of processing to the workpiece, overwrite the sensing value detected by the sensing value detecting unit;

a correction value calculating unit configured to calculate a correction value based on a reference sensing value in the reference sensing value storing unit and a processing sensing value in the processing sensing value storing unit;

a servomotor control unit configured to control the servomotor based on the slide position detected by the slide position detecting unit, the slide position that has been set, and the correction value calculated by the correction value calculating unit; and a temperature sensor configured to detect temperature at the slide, wherein:

when temperature data detected based on a value of the temperature sensor is greater than temperature data that has been set previously set, the servomotor control unit transmits an signal instructing calculation of a correction value to the correction value calculating unit, and executes control of the servomotor in a next cycle of processing based on the slide position detected by the slide position detecting unit, the slide position that has been set, and the correction value calculated by the correction value calculating unit, at timing at which the slide reaches the stop position.

2. The servo press according to claim 1, wherein the linear encoder is disposed at the stop position of the slide.

3. The servo press according to claim 1, wherein the servomotor control unit transmits a signal instructing calculation of a correction value to the correction value calculating unit, and executes control of the servomotor in a next cycle of processing based on the slide position detected by the slide position detecting unit, the slide position that has been set, and the correction value calculated by the correction value calculating unit, at timing at which the slide reaches the stop position.

4. The servo press according to claim 1, comprising:

a threshold value storing unit configured to store a threshold value for a magnitude of the correction value, wherein when the correction value calculated by the correction value calculating unit is greater than the threshold value stored in the threshold value storing unit, the servomotor control unit executes control of the servomotor in a next cycle of processing based on the slide position detected by the slide position detecting unit, the slide position that has been set, and the correction value calculated by the correction value calculating unit, at timing at which the slide reaches the stop position.

5. The servo press according to claim 1, wherein the temperature detected by the temperature sensor is related with thermal expansion of the slide.

6. A control method for a servo press including:

a slide configured to move up and down;

a servomotor configured to drive the slide up and down;

an encoder disposed at the servomotor;

a slide position detecting unit;

a setting unit configured to set a positional condition of the slide;

a linear encoder configured to sense a stop position of the slide;

a sensing value detecting unit configured to detect a sensing value of the sensing element at the stop position of the slide;

a reference sensing value storing unit;

a processing sensing value storing unit;

a correction value calculating unit;

a servomotor control unit; and a temperature sensor configured to detect temperature at the slide, the method comprising:

a first step in which prior to a series of processing to a workpiece, the servomotor control unit moves the slide to the stop position by controlling the servomotor based on the slide position detected by the slide position detecting unit, and the slide position that has been set;

a second step in which the sensing value detecting unit detects the sensing value of the sensing element at the stop position of the slide, and stores the detected sensing value in the reference sensing value storing unit;

a third step in which in the series of processing, the sensing value detecting unit detects the sensing value of the sensing element at the stop position of the slide, and stores the detected sensing value in the processing sensing value storing unit;

a fourth step in which the correction value calculating unit calculates a correction value based on a reference sensing value in the reference sensing value storing unit and a processing sensing value in the processing sensing value storing unit; and a fifth step in which in a next processing, the servomotor control unit controls the servomotor based on the slide position detected by the slide position detecting unit, the slide position that has been set, and the correction value calculated by the correction value calculating unit, wherein:

when temperature data detected based on a value of the temperature sensor is greater than temperature data that has been set previously set, the servomotor control unit transmits an signal instructing calculation of a correction value to the correction value calculating unit, and executes control of the servomotor in a next cycle of processing based on the slide position detected by the slide position detecting unit, the slide position that has been set, and the correction value calculated by the correction value calculating unit, at timing at which the slide reaches the stop position.

7. The control method according to claim 6, wherein the temperature detected by the temperature sensor is related with thermal expansion of the slide.

* * * * *